(12) United States Patent
Schucker et al.

(10) Patent No.: US 6,369,753 B1
(45) Date of Patent: Apr. 9, 2002

(54) HOST-INDEPENDENT MONOLITHIC INTEGRATED CIRCUIT FOR RF DOWNCONVERSION AND DIGITAL SIGNAL PROCESSING OF GPS SIGNALS

(75) Inventors: Douglas W. Schucker, Gilbert; Jeffrey J. Ogren, Chandler; Thomas Michael King, Tempe, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/644,033

(22) Filed: Aug. 22, 2000

(51) Int. Cl.[7] ............................. H04B 7/185; G01S 5/02
(52) U.S. Cl. ................................................. 342/357.12
(58) Field of Search ...................... 342/357.12; 701/213

(56) References Cited

U.S. PATENT DOCUMENTS

| | | | | |
|---|---|---|---|---|
| 4,785,463 A | * | 11/1988 | Janc et al. ..................... 375/1 |
| 5,148,452 A | * | 9/1992 | Kennedy et al. ............... 375/96 |
| 5,504,684 A | * | 4/1996 | Lau et al. ..................... 364/443 |
| 5,535,237 A | * | 7/1996 | Lapadula, III et al. ..... 375/200 |
| 5,564,098 A | * | 10/1996 | Rodal et al. ................. 455/314 |
| 5,877,724 A | * | 3/1999 | Davis .......................... 342/357 |
| 6,115,595 A | * | 9/2000 | Rodal et al. ................. 455/333 |
| 6,122,506 A | * | 9/2000 | Lau et al. ..................... 455/427 |

* cited by examiner

Primary Examiner—Michael J. Zanelli
(74) Attorney, Agent, or Firm—Kevin D. Wills

(57) ABSTRACT

A global position system (GPS) receiver for a host product is controlled by a microcontroller that also controls other functions in the host product. The GPS receiver includes an RF downconverter and a digital signal processor. The digital signal processor includes a correlator and an interface for asynchronously interfacing the correlator with the product's microcontroller. A monolithic integrated circuit includes RF downconverter circuitry, the correlator, and the interface for the GPS receiver.

24 Claims, 4 Drawing Sheets

HOST-INDEPENDENT MONOLITHIC INTEGRATED CIRCUIT FOR RF DOWNCONVERSION AND DIGITAL SIGNAL PROCESSING OF GPS SIGNALS

BACKGROUND OF THE INVENTION

A. Field of the Invention

This invention relates to the field of radio frequency (RF) receivers. More particularly, this invention related to a monolithic integrated circuit (IC) that includes radio frequency (RF) downconverter circuitry and digital signal processing circuitry for a global positioning system (GPS) receiver, for use in a host product controlled by a microcontroller.

B. Description of Related Art

The Global Positioning System (GPS) is a satellite-based radionavigation system developed and operated by the U.S. Department of Defense. GPS allows land, sea and airborne users to constantly determine their three-dimensional position, velocity, and time anywhere in the world with a precision and accuracy far better than other radionavigation systems currently available. The GPS consists of three segments: user, space and control. The user segment consists of individual receivers, processors, and antennas that allow land, sea or airborne operators to receive GPS satellite broadcasts and compute their precise position, velocity and time from the information received from the satellites.

The space segment presently consists of 24 satellites, in orbit around the earth, which continuously broadcast both position and time data to users throughout the world. These satellites are positioned so that, at any given time, a user at any location on the surface of the earth will be able to receive signals from between five and eight satellites.

The control segment consists of five land-based control and monitoring stations located in Colorado Springs (the master control station), Hawaii, Ascension Island, Diego Garcia, and Kwajalein. These stations monitor transmissions from the GPS satellites as well as the operational status of each satellite and its exact position in space. The master control station transmits corrections for the satellite's position and orbital data back to the satellites. The satellites synchronize their internally stored position and time with the data broadcast by the master control station, and the updated data are reflected in subsequent transmissions to the user's GPS receiver, resulting in improved prediction accuracy.

The signals transmitted by the GPS satellites are specified in detail in Interface Control Document, ICD-GPS-200, Rev. C, titled "Navstar GPS Space Segment/Navigation User Interface," which was initially released by the U.S. government on Oct. 10, 1993, and then revised on Oct. 13, 1995, and on Sep. 25, 1997 ("the GPS specification"). The GPS specification is fully incorporated herein by reference.

Briefly stated, GPS satellites transmit GPS signals in two frequency bands, conventionally referred to as the L1 channel and the L2 channel. The L1 channel has a nominal carrier frequency of 1575.42 MHz, and the L2 channel has a nominal carrier frequency of 1227.6 MHz. Due to the relative motion between the satellite and the observer, however, these frequencies may be Doppler shifted up or down by as much as 5 kHz. Most commercial receivers use only the L1 channel, as the L2 channel is used primarily for military applications. The L1 channel uses two carrier components that are in phase quadrature with each other. Each carrier component is modulated by a separate bit train using binary phase shift keying (BPSK). Each bit train is the modulo-2 sum of 50 bps satellite navigational ("NAV") data and a pseudo-random noise (PN) code. The NAV data includes satellite ephemerides (i.e., satellite position information), timing information, status information, and other data. Two different PN codes are used: the precision (P) code, which may be replaced by the Y-code in some instances, and the coarse/acquisition (C/A) code. Each satellite uses unique PN codes. The C/A code for a given satellite is a particular Gold code with a nominal chipping rate of 1.023 MHz and a length of 1 millisecond. The P-code for a satellite has a nominal chipping rate of 10.23 MHz and a length of 7 days. Accordingly, the P-code provides the most precision position and time information, whereas the C/A code is used primarily for acquisition of the P-code.

GPS receivers perform a number of different processing operations on the GPS signals that they receive in order to obtain the desired position, velocity, and time (PVT) information. First, GPS receivers typically downconvert the high frequency GPS satellite signals to an intermediate frequency (IF) signal. The radio frequency (RF) downconversion process is conventionally accomplished using one or more superheterodyne stages, in which the GPS signal is mixed with a local oscillator (LO) signal. In addition to one or more mixers, the RF downconversion section of GPS receiver typically includes one or more amplifiers and bandpass filters.

Second, the IF signal is typically passed to a digital signal processing section (DSP) section of the GPS receiver. In the DSP section, the IF signal is digitized and the in-phase (I) and quadrature (Q) components are separated out and demodulated. The DSP then processes the carrier-free I and Q components to "acquire" the GPS signals from one or more GPS satellites and, once the signals are acquired, to "track" the GPS signals.

In the acquisition step, a GPS receiver "locks on" to the signal transmitted by a particular GPS satellite by determining: (1) the PN codes used by the satellite; (2) the code phase of each PN code, i.e., which "chip" in the entire PN code sequence the satellite's signal currently is at; (3) the Doppler shift of the satellite's signal; and (4) the time delay between the PN codes from the satellite and a reference used by the GPS receiver. GPS receivers typically make these determinations using correlation methods. Specifically, the GPS receiver "correlates" the carrier-free I and Q components with a "replica" PN code that corresponds to the PN code of a GPS satellite that may be in view. The GPS receiver then integrates or low-pass filters the correlated signal to obtain a correlator output. The GPS receiver adjusts the various parameters of the "replica" PN code, such as the particular PN code used, the PN code phase, the PN code time delay, and the Doppler frequency to maximize the correlator output.

Once the GPS signal from a given satellite is acquired, it is "tracked" by adjusting one or more parameters, such as the timing of the "replica" PN code, so that the GPS signal remains highly correlated with the satellite's PN code. From the timing of the "replica" PN code, relative to a local clock, the GPS receiver is able to calculate a pseudorange, which represents the distance between the GPS receiver and the satellite.

The GPS receiver also obtains the NAV data from the correlator output, from which the GPS receiver obtains the satellite ephemerides and timing information. By combining the pseudorange and NAV data from at least four GPS satellites, the GPS receiver is able to compute its three-dimensional location and to determine the correct time. GPS receivers may obtain this information from multiple satellites by acquiring and tracking signals from several different GPS satellites in succession. However, many GPS receivers are provided with multiple signal processing channels, with each channel corresponding to a particular GPS satellite, so that the GPS can process GPS signals from several GPS satellites at once.

The number of products using GPS information has rapidly increased in recent years. GPS components are now found in numerous products, including cellular telephones, pagers, and personal digital assistants (PDAs). Because these devices require microchip-size components, there is a need for simple, cost-effective miniaturization of navigation receivers for consumer use.

A number of different methods for adding GPS functionality to a product exist. In one such approach, the GPS receiver added to the product includes a radio frequency (RF) downconverter integrated circuit (IC), a signal processing application specific integrated circuit (ASIC), a signal processing memory component, and a microprocessor. This approach is used in the UT, GT, and SL Oncore receivers of Motorola, Inc. A disadvantage with this approach, however, is that the addition of these several integrated circuits to a product can be prohibitive, both in terms of cost and the space available in the product. The addition of the GPS microprocessor also consumes a significant amount power.

In another approach, the GPS receiver added to the product includes an RF downconverter IC and a complex IC that includes a signal processing element, signal processing memory, and a GPS microprocessor. This approach is used in the M12 Oncore receiver of Motorola, Inc. However, the complex IC has a large footprint, a high pin count, and tends to consume a great deal of power. This can make the complex IC difficult to incorporate into many types of products. The complex IC can also be costly to produce.

Another disadvantage with both approaches is that the RF downconverter IC requires its own crystal reference, and the addition of this component further significantly increases the cost, size, and power consumption of the GPS receiver.

Accordingly, there is a need in the art to provide means for adding GPS functionality to products, so that the GPS components take up less space, consume less power, and are less costly than existing approaches for adding GPS functionality to products.

SUMMARY OF THE INVENTION

In a first principal aspect, the present invention provides a receiver for a product that is controlled by a microcontroller. The receiver comprises a radio frequency (RF) downconverter for downconverting a radio frequency (RF) signal in a first band of frequencies to an intermediate frequency (IF) signal in a second band of frequencies. The RF signal includes at least one target signal. The receiver also comprises a digital signal processor coupled to both the RF downconverter and the microcontroller. The digital signal processor includes a correlator for acquiring and tracking the at least one target signal in response to signals from the microcontroller. The digital signal processor also includes an asynchronous interface for interfacing said correlator with said microcontroller.

In a second principal aspect, the present invention provides a substantially monolithic integrated circuit that comprises radio frequency (RF) downconverter circuitry and a digital signal processor coupled to the RF downconverter circuitry. The RF downconverter circuitry is for downconverting a radio frequency (RF) signal in a first band of frequencies to an intermediate frequency (IF) signal in a second band of frequencies. The RF signal includes at least one target signal. The digital signal processor includes a correlator for acquiring and tracking the at least one target signal.

In a third principal aspect, the present invention provides a method for using a microcontroller to obtain data from a signal. In accordance with the method, a radio frequency (RF) signal in a first band of frequencies is received and downconverted to an intermediate frequency (IF) signal in a second band of frequencies. The IF signal is digitized to provide a digital signal, and the digital signal is correlated with a replica signal to provide output data. An interrupt signal is generated at predetermined time intervals. In response to the interrupt signal, the microcontroller reads the output data through an asynchronous interface.

DETAILED DESCRIPTION OF THE PREFERRED EMBODIMENTS

Figure 1:
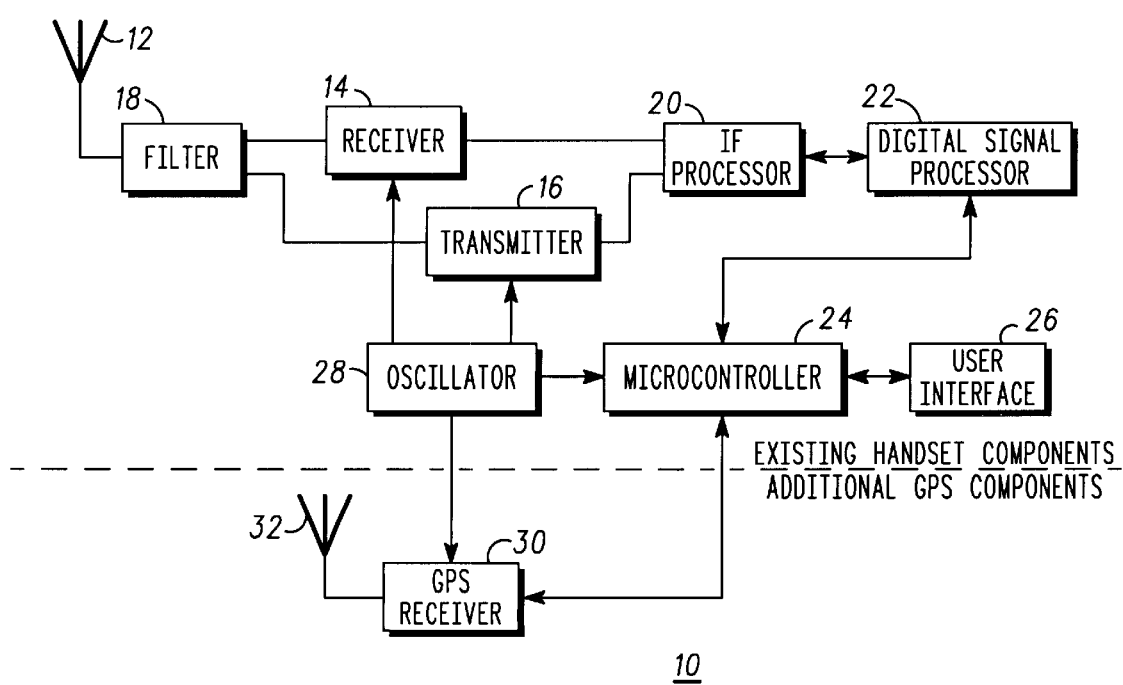
FIG. 1 is an overall block diagram of a GPS receiver in a host product controlled by a microcontroller, in accordance with an exemplary embodiment of the present invention.

FIG. 1 shows a host product 10 to which GPS functionality has been added, in accordance with an exemplary embodiment of the present invention. In the example shown in FIG. 1, host product 10 is a code division multiple access (CDMA) handset. As shown in FIG. 1, a typical CDMA handset has an antenna 12, with a receiver 14 and a transmitter 16 coupled to antenna 12 via a filter 18. Receiver 14 and transmitter 16 are coupled to an IF processor 20, which, in turn, is coupled to a digital signal processor 22. A typical CDMA handset also includes a microcontroller 24, which controls digital signal processor 22 and a user interface 26. CDMA handsets also normally include one or more oscillators, such as oscillator 28. Oscillator 28 may serve as the local oscillator used by receiver 14 and/or transmitter 16. Alternatively, or in addition, oscillator 28 may provide the clock signal used by microcontroller 24.

In accordance with preferred embodiments of the present invention, host product 10 is provided with GPS functionality by the addition of GPS components, including a GPS receiver 30 and a GPS antenna 32, to the existing components described above. In order to reduce the number, size, cost, and power consumption of the components that must be added to product 10 to provide it with GPS functionality, GPS receiver 30 need not include its own microcontroller. Instead, GPS receiver 30 preferably uses microcontroller 24 that is already present in product 10. Moreover, as described in more detail below, GPS receiver 30 preferably includes a host independent interface, so that the same configuration of GPS receiver 30 can be used in different host products that are controlled by different microcontrollers. To further reduce the number of added GPS components, much of GPS receiver 30 may be provided as a substantially monolithic integrated circuit and may beneficially use one or more oscillators already present in product 10, such as oscillator 28.

Although in the example shown in FIG. 1, product 10 is a CDMA handset, GPS functionality may be added to many other kinds of products, in accordance with the present invention. Such other products may include without limitation, wireless telephones, pagers, personal digital assistants (PDAs), vehicular navigation systems, and other electronic devices and systems. Moreover, the present invention is particularly suited for such products that already have a microcontroller and, optionally, a suitable oscillator.

Figure 2:
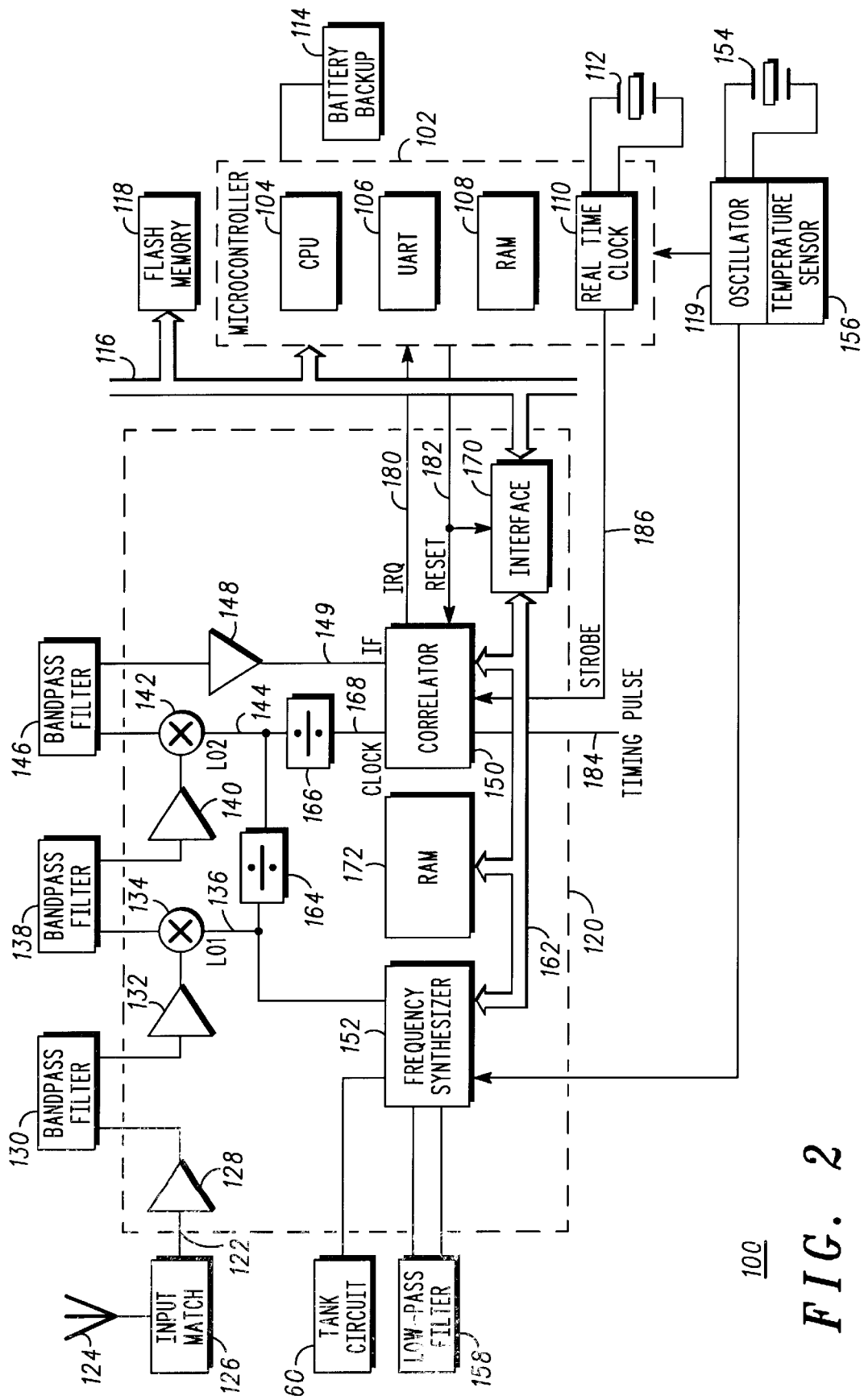
FIG. 2 is a more detailed block diagram of a GPS receiver in communication with a host product's microcontroller, in accordance with an exemplary embodiment of the present invention.

FIG. 2 provides a more detailed illustration of a GPS receiver 100 coupled to a microcontroller 102, in accordance with a preferred embodiment of the present invention. As described above microcontroller 102 is typically an existing component in a host product and typically performs non-GPS functions in the host product, as well as the GPS functions described herein. Microcontroller 102 typically includes a central processing unit (CPU) 104, which is typically provided as a microprocessor. Microcontroller 102 may also include other components, such as a universal asynchronous receiver/transmitter (UART) 106, random access memory (RAM) 108, and a real time clock 110. As is well known in the art, real time clock 110 typically uses a crystal 112 to produce a signal with a frequency of approximately 32 kHz. Microcontroller 102 may also be provided with a battery backup system 114.

Microcontroller 102 is coupled to a bus 116 for transferring data, address, and control signals. The host product may also have other components coupled to bus 116, such as a flash memory 118. As described in more detail below, GPS receiver 100 is also coupled to bus 1 16.

The host product may also include an oscillator 119. For example, oscillator 119 may provide the clock signal for microcontroller 102, as shown in FIG. 2, or it may perform other functions in the host product.

With reference to FIG. 2, GPS receiver 100 includes a substantially monolithic integrated circuit (IC) 120 coupled to a number of external components. As described in more detail below, IC 120 includes much of the circuitry needed for radio frequency (RF) downconversion, digital signal processing, and interfacing with microcontroller 102. IC 120 may be fabricated using silicon/germanium BiCMOS technology.

To perform the RF downconversion of the GSP signals, IC 120 is provided with an RF input 122, which is coupled to a GPS antenna 124, optionally via an input match network 126. IC 120 typically includes a first low noise amplifier 128, which amplifies the signal appearing at RF input 122 and applies it to a bandpass filter 130. Bandpass filter 130 preferentially selects the frequencies associated with GPS signals, e.g., the frequencies in the L1 channel.

A second low noise amplifier 132 amplifies the signal from bandpass filter 130 and applies it to a mixer 134. Mixer 134 mixes the output of amplifier 132 with a first local oscillator ("LO1") signal 136. In this way, mixer 134 downconverts the frequency of the output of amplifier 132 to provide a first intermediate frequency (IF) signal. The output of mixer 134 is applied to a bandpass filter 138, which selectively passes frequencies near a first predetermined intermediate frequency.

A first IF amplifier 140 amplifies the output of bandpass filter 138 and applies it to a mixer 142. Mixer 142 mixes the output of amplifier 140 with a second local oscillator ("LO2") signal 144. Mixer 142 downconverts the frequencies output from amplifier 140 to provide a second IF signal. The output of mixer 142 is applied to a bandpass filter 146, which selectively passes frequencies near a second predetermined intermediate frequency. The output of bandpass filter 146 is processed by a limiter 148 to provide a working IF signal 149. Working IF signal 149, in turn, is applied to a correlator 150 for digital signal processing, as described in more detail below.

LO1 signal 136 is preferably produced by a frequency synthesizer 152 in IC 120. As is well known in the art, frequency synthesizer 152 uses a voltage controlled oscillator and a phase-locked loop to produce a signal that is phase locked to a reference oscillator. As shown in FIG. 2, the reference oscillator is conveniently provided by oscillator 119, which is also used by the host product. Alternatively, instead of using an oscillator already used by the host product, the reference oscillator may be provided as an additional GPS component, in which case it may be either external or internal to IC 120.

In any event, oscillator 119 should be highly stable in order to serve as the reference oscillator for frequency synthesizer 152. Accordingly, oscillator 119 will typically use a crystal 154. Oscillator 119 may also be provided with a temperature sensor 156 for temperature compensation.

In addition to oscillator 119, frequency synthesizer 152 may use other components that are external to IC 120. In particular, the filter element used in the phase-locked loop may be provided as an external low-pass filter 158. Additionally, the frequency selective element in the voltage controlled oscillator may be provided as an external tank circuit 160, which will typically include one or more inductors and one or more varactors.

As noted above, frequency synthesizer 152 produces a signal, namely LO1 signal 136, that is phase-locked to the signal from the reference oscillator, such as oscillator 119. Preferably, frequency synthesizer 152 is provided with programmable integral and/or fractional frequency dividers to select the frequency of LO1 signal 136 that it synthesizes from the reference oscillator's frequency. Moreover, the programmable frequency dividers in frequency synthesizer 152 may be controlled by digital signals from a bus 162, internal to IC 120.

Similarly, IC 120 preferably uses a frequency divider 164 to produce LO2 signal 144 from LO1 signal 136. Alternatively, LO2 signal 144 may be produced by a separate oscillator, which may be either external or internal to IC 120.

Preferably, IC 120 uses a frequency divider 166 to produce a clock signal 168, for use in correlator 150, from LO2 signal 144. Alternatively, clock signal 168 may be produced by a separate clock oscillator, which may be either external or internal to IC 120.

In this way, amplifiers 128, 132, and 140, limiter 148, mixers 134 and 142, bandpass filters 130, 138, 146, frequency synthesizer 152, and frequency dividers 164 and 166 comprise an RF downconverter section of GPS receiver 100. This RF downconverter section operates to reduce the frequencies of the GPS signals received by GPS receiver 100. In particular, the GPS signal from a given satellite appearing at RF input 122 will typically appear in a first band of frequencies with a carrier frequency of 1575.42 MHz (the nominal L1 carrier frequency) shifted by a Doppler frequency caused by the satellite's motion relative to GPS receiver 100. The corresponding GPS signal in working IF signal 149 will appear in a second band of much lower frequencies, with a much lower carrier frequency. Specifically, the carrier frequency of IF signal 149 will be the carrier frequency of this GPS signal at RF input 122 shifted by an amount determined by the frequencies of LO1 signal 136 and LO2 signal 144.

Although a particular exemplary embodiment of the RF downconverter is shown in FIG. 2 and described above, other implementations could also be used. For example, while the RF downconverter shown in FIG. 2 is shown having two mixing stages, a greater or fewer number of mixing stages could be used.

In addition to RF downconverter components, IC 120 also includes digital signal processor components, namely, correlator 150 and an interface 170. IC 120 may also include a random access memory (RAM) 172. Bus 162 connects frequency synthesizer 152, correlator 150, interface 170, and RAM 172 and carries digital address, data and control signals. As described in more detail below, correlator 150 processes IF signal 149, under the control of microcontroller 102, to obtain pseudorange information and NAV data for one or more GPS satellites. Interface 170 provides an asynchronous interface between GPS receiver 100 and microcontroller 102. More particularly, interface 170 transfers digital address, data, and control signals between bus 162 and bus 116.

In addition, as described in more detail below, correlator 150 generates an interrupt (IRQ) signal 180 to interrupt the operation of microcontroller 102. Preferably, correlator 150 and interface 170 may be reset to a known default state by means of a reset signal 182 from microcontroller 102. Correlator 150 may also be used for external timing applications. In particular, correlator 150 may produce timing pulses 184, which may be a one pulse-per-second signal. Also, as described in more detail below, correlator 150 may be configured to provide microcontroller 102 with information on the time delay between IRQ signal 180 and an external strobe signal 186.

Figure 3:
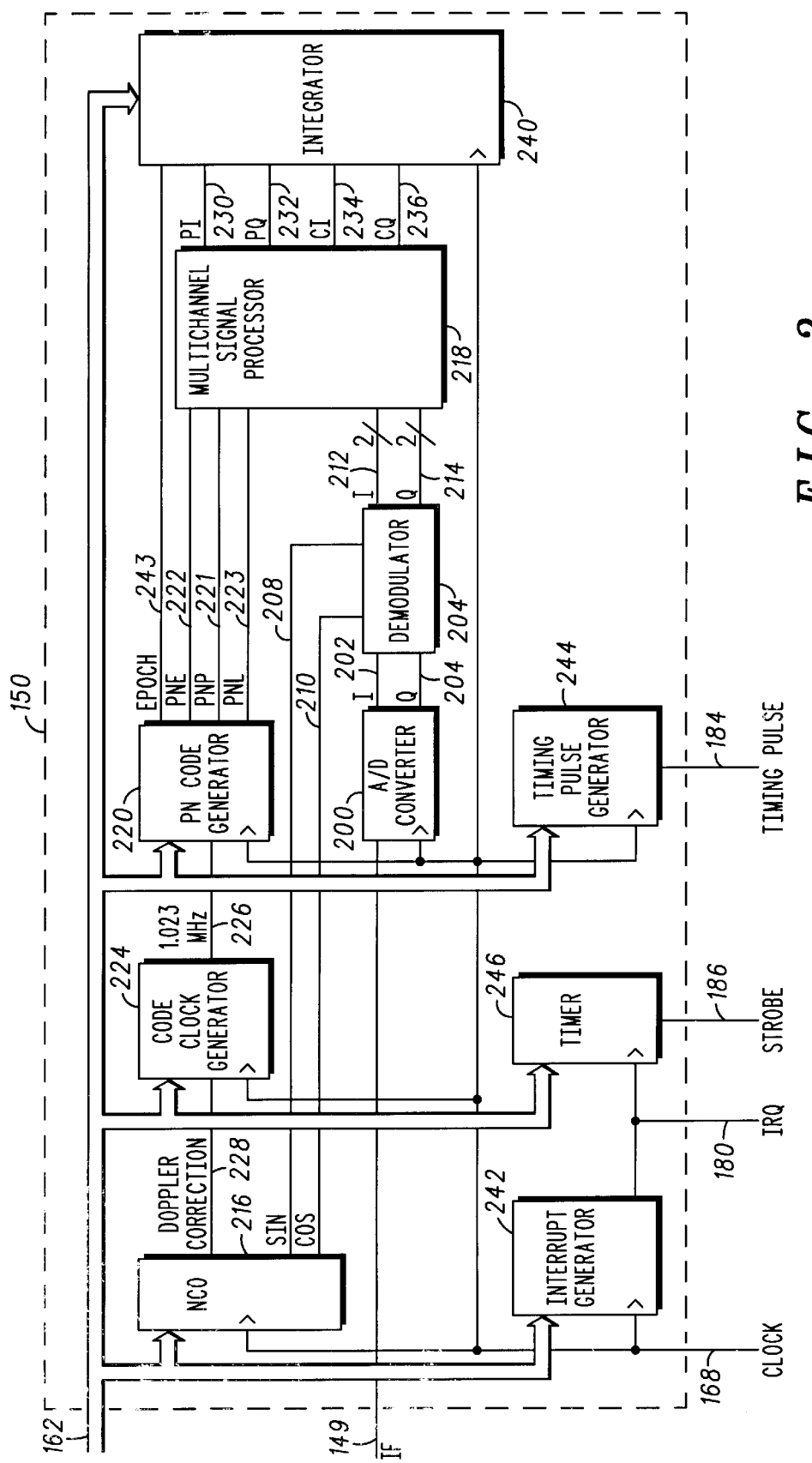
FIG. 3 is a block diagram of the correlator of the GPS receiver of FIG. 2, in accordance with an exemplary embodiment of the present invention.

FIG. 3 shows the functional components of correlator 150 in more detail. Briefly stated, correlator 150 performs digital signal processing on IF signal 149 to obtain pseudorange information and NAV data for one or more GPS satellites. Preferably, correlator 150 has a multichannel design in that it is able to acquire and track signals from a plurality of GPS satellites, such as twelve satellites, at once. The operation of correlator 150 may be similar to that disclosed in U.S. Pat. No. 5,148,452, which is incorporated herein by reference.

To allow for digital signal processing, IF signal 149 is digitized by A/D processor 200. Specifically, A/D converter 200 performs digitization on IF signal 149 by sampling it at the frequency of clock signal 168. In the simplest embodiments, AID converter 200 performs only one-bit digitization on IF signal 149. However, in other embodiments, A/D converter 200 may do multi-bit digitization of IF signal 149.

Preferably, clock signal 168 has a frequency that is approximately four times that of the carrier frequency in IF signal 149. Accordingly, the in-phase "I" and quadrature "Q" components of the GPS signals correspond to alternate bits of the digitized IF signal. A/D processor 200 separates these two components to provide an I signal 202 and a Q signal 204.

A demodulator 206 demodulates I signal 202 and Q signal 204 by mixing them with a local oscillator signal with a particular phase, namely, a sine signal 208 and a cosine signal 210. Signals 208 and 210 have a frequency related to the carrier frequency of a given GPS signal in IF signal 149, i.e., the L1 carrier frequency, as shifted by the satellite's Doppler frequency and then downconverted by LO1 signal 136 and LO2 signal 144. This mixing produces a difference signal corresponding to a demodulated I signal 212 and a demodulated Q signal 214. For example, in the simplest case of only one-bit digitization, demodulated signals 212 and 214 are either +1, 0, −1, depending on whether the one-bit digitized IF component is in phase, 90° out of phase, or 180° out of phase, respectively, with the corresponding local oscillator signal (either sine signal 208 or cosine signal 210). Thus, in embodiments in which A/D converter 200 performs only one-bit digitization, demodulator 206 outputs a two-bit demodulated I signal 212 and a two-bit demodulated Q signal 214, wherein one bit represents the magnitude of the signal, and the other bit represents the sign.

Signals 208 and 210 are generated by a numerically controlled oscillator (NCO) 216, which is controlled by microcontroller 102 via bus 162. Specifically, microcontroller 102 writes Doppler frequency information to NCO 216, so that signals 208 and 210 will have the frequency needed to remove the Doppler shifted carrier frequency from the GPS signal of a particular satellite.

Because different GPS satellites may have different Doppler frequencies, NCO 216 will typically generate separate sine and cosine signals for each channel. Moreover, although only a single demodulator is shown in FIG. 3, correlator 150 will normally have a separate demodulator and corresponding demodulated I and Q outputs for each channel.

The demodulated I and Q signals for each channel, such as signals 212 and 214, are applied to a multichannel signal processor 218, where they are correlated with replica PN codes, as described in more detail below. A PN code generator 220 generates replica PN codes for each channel. Specifically, PN code generator 220 generates for each channel a prompt PN ("PNP") code 221, an early PN ("PNE") code 222, and a late PN ("PNL") code 223. For each channel, PNE code 222 is the same sequence as PNP code 221 but shifted ¼ chip earlier, and PNL code 223 is the same sequence as PNP code 221 but shifted ¼ chip later. The particular PN codes that PN code generator 220 uses for each channel are specified by commands from microcontroller 102, which commands reach generator 220 via bus 162.

A code clock generator 224 generates a 1.023 MHz signal 226 for each channel, from which PN code generator 220 then generates the replica PN codes. Code clock generator 224 may generate signal 226 by frequency dividing clock signal 168. The phase of signal 226 for each channel is controlled, in part, by commands from microcontroller 102, which commands reach code clock generator 224 via bus 162. A Doppler correction signal 228 for each channel also contributes to the phase of signal 226 in each channel. Specifically, Doppler correction signal 228 for a given channel causes code clock generator 224 to adjust the phase of signal 226 in that channel in order to maintain coherence between the replica PN codes for that channel, i.e., signals 221–223, and the motion induced on that phase due to signal Doppler.

Doppler correction signal 228 is produced by NCO 216. Specifically, when NCO 216 receives Doppler frequency information for a given channel from microcontroller 102, it not only adjusts the frequency of sine signal 208 and cosine signal 210 for the channel, it also produces the appropriate Doppler correction signal 228 to adjust the phase of the replica PN codes due to Doppler shift for the satellite corresponding to that channel.

Multichannel signal processor 218 correlates the demodulated I and Q signals for each channel, such as signals 212 and 214, with the corresponding PNP signal 221 to produce a prompt in phase ("PI") signal 230 and a prompt quadrature ("PQ") signal 232 for each channel. Multichannel signal processor 218 also correlates the demodulated I and Q signals for each channel, such as signals 212 and 214, with the corresponding PNE signal 222 and PNL signal 223. The difference between the PNE and PNL results yields a code discriminator in phase ("CI") signal 234 and a code discriminator quadrature ("CQ") signal 236 for each channel. In the simplest case of one-bit digitization, this correlation may be accomplished by taking the XOR sum of the sign bit of the demodulated I and Q signals with the replica PN codes.

An integrator 240 adds up each of signals 230, 232, 234, and 236, for each channel, for one millisecond periods of time, to provide an integrated PI signal, an integrated PQ signal, an integrated CI signal, and an integrated CQ signal. Microcontroller 102 reads these integrated signals, via bus 162, when interrupted by IRQ signal 180. An interrupt generator 242 in correlator 150 generates IRQ signal 180 every millisecond. In addition, integrator 240 may receive an epoch signal 243, generated for each channel by PN code generator 220, every time the PN code epoch for that channel is completed. Integrator 240 may reset the integrated output signals to zero for that channel when it receives epoch signal 243 for that channel.

Based on the integrated PI, PQ, CI, and CQ signals from integrator 240 microcontroller 102 is able to control the various parameters used in the digital signal processing to acquire and track signals from one or more GPS satellites. In particular, to acquire a signal in a given channel microcontroller 102 attempts to maximize the integrated PI and PQ signals for that channel. Microcontroller 102 performs this maximization by adjusting a number of parameters that correlator 150 uses to process the signal in that channel. Specifically, microcontroller 102 writes input data to PN code generator 220 to specify the particular PN code, and the PN code phase, that PN code generator 220 generates for the channel. Microcontroller 102 writes input data to code clock generator 224 to control the phase of signal 226 that is used to generated the PN code for the channel. Microcontroller also writes Doppler frequency information to NCO 216 so that signals 208, 210, and 228 for that channel include the proper Doppler correction.

Once a signal has been acquired in a given channel, microcontroller 102 tracks the signal, typically by controlling the same parameters, to try to maintain the integrated CI and CQ signals for that channel, which represent an error output, at a zero value. In addition, microcontroller 102 is able to calculate a time delay with respect to a reference clock, and thus a pseudorange, for a given satellite, based on the PN code phase and the phase of 1.023 MHz signal 226 used to generated the PN code, for that satellite's channel. Finally, microcontroller 102 obtains the NAV data for the satellite from the integrated PI and PQ signals for that satellite's channel.

In addition to acquiring and tracking satellite signals, correlator 150 may be used for other timing applications. For example, correlator 150 may include a timing pulse generator 244 connected to clock 168 and to bus 162. Using the timing information obtained from the GPS satellites, microcontroller 102 may control pulse generator 244 to produce highly accurate timing pulses 184. In typical applications, timing pulses 184 may have a frequency of 1 Hz.

Correlator 150 may also include a timer 246 for measuring the time delay between IRQ signal 180 and strobe signal 186. As noted above, strobe signal 186 would typically come from outside of IC 120. For example, strobe 186 may be produced by real-time clock 110, as shown in FIG. 2. Timer 246, which is connected to bus 162, receives IRQ signal 180 and strobe signal 186. Timer 246 measures the time difference from an edge of strobe signal 186 to IRQ signal 180 and outputs this time difference to microcontroller 102, via bus 162. In this way, microcontroller 102 can synchronize time from an external system, such as real time clock 110 with the time information from GPS receiver 100.

Figure 4:
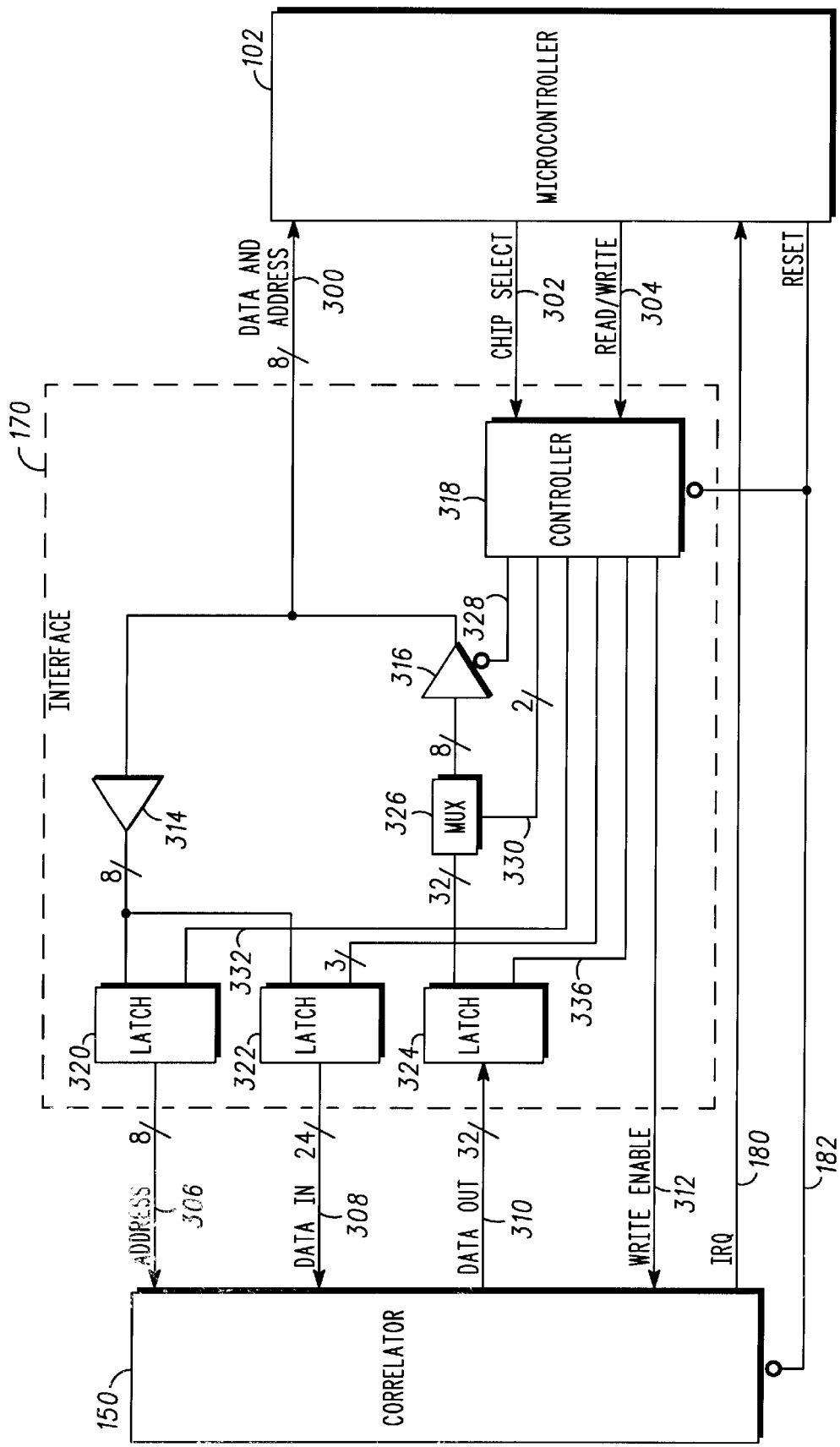
FIG. 4 is a block diagram of the correlator, interface, and microcontroller shown in FIG. 2, in accordance with an exemplary embodiment of the present invention.

FIG. 4 shows how interface 170 transfers digital signals between microcontroller 102 and correlator 150, in accordance with a preferred embodiment of the present invention. Preferably, interface 170 provides an asynchronous interface and enables the configuration of GPS receiver 100 to be substantially independent of the particular microcontroller 102 in a given host product.

As shown in FIG. 2, microcontroller 102 is connected to interface 170 via bus 116. With reference to FIG. 4, bus 116 includes a data and address bus 300, which is typically eight bits wide, a chip select bus 302, which is typically one bit wide, and a read/write bus 304, which is typically one bit wide. Also as shown in FIG. 2, correlator 150 is connected to interface 170 via a bus 162. With reference to FIG. 4, bus 162 includes an address bus 306, which is typically eight bits wide, a data in bus 308, which is typically twenty-four bits wide, a data out bus 310, which is typically thirty-two bits wide, and a write enable bus 312, which is typically one bit wide.

In a preferred embodiment, interface 170 includes an input buffer 314, an output buffer 316, a controller 318, latches 320, 322, and 324, and a multiplexer 326. Data and address bus 300 is connected to the input of input buffer 314 and to the output of output buffer 316. Chip select bus 302 and read/write bus 304 are connected to controller 318. Address bus 306 is connected to the output of first latch 320. Data in bus 308 is connected to the output of second latch 322. Data out bus 310 is connected to third latch 324. Write enable bus 312 is connected to controller 318.

The output of buffer 314 is connected to the inputs of latches 320 and 322. The output of latch 324 is connected to the input of multiplexer 326, and the output of multiplexer 326 is connected to buffer 316. Controller 318 is connected to buffer 316, typically via a one-bit control bus 328, to multiplexer 326, typically via a two-bit control bus 330, to latch 320, typically via a one-bit control bus 332, to latch 322, typically via a three-bit control bus 334, and to latch 324, typically via a one-bit control bus 336.

In a typical read or write cycle, microcontroller 102 transfers thirty-two bits in total by transferring eight bits (one byte) at a time. In a write cycle, the first byte is typically an address, and the other three bytes are data. In a read cycle, typically all four bytes are data. Microcontroller 102 uses read/write bus 304 to signify whether a read or a write operation is being performed. For example, microcontroller 102 may cause read/write bus 304 to be high during a read cycle and low during a write cycle. Microcontroller 102 uses chip select bus 302 to signify when a data or address byte is ready to be transferred. For example, microcontroller 102 may cause chip select bus 302 to go low when a byte is ready to be transferred.

Thus, a typical write cycle would occur as follows. Microcontroller 102 produces a low signal on read/write bus 304 to signify a write cycle. Controller 318 receives this low signal over bus 304 and responsively controls buffer 316, via bus 328, to ensure that buffer 316 will not produce an output that may interfere with the input of buffer 314. Microcontroller 102 writes the first byte, which is typically an address, to bus 300. Buffer 314 buffers this signal so that it appears at the inputs of latches 320 and 322.

When the first byte is ready to be transferred, microcontroller 102 causes the signal on chip select bus 302 to go low. In response, controller 318 signals latch 320, via bus 332, to latch the first byte so that it appears on address bus 306. Microcontroller 102 then writes the second byte, typically a data byte, to bus 300 and signals low over chip select bus 302. In response, controller 318 signals latch 322, via bus 334, to latch the second byte, appearing at its input, so that it appears on the first eight bits of data in bus 308. Thereafter, microcontroller 102 writes the third and fourth bytes of the write cycle to bus 300, and signals low on bus 302, in a similar fashion. In response to each low signal over bus 302, chip select sends a different signal over bus 334 to latch 322, in order to cause latch 322 to latch the third and fourth bytes so that they appear in the remaining bits available in data in bus 308. When the write cycle is complete, controller 318 sends a signal to correlator 150, over write enable bus 312, to signify that the transfer from microcontroller 102 to address bus 306 and data in bus 308 is complete. Controller 318 may include an internal 2-bit counter to keep track of which byte is being transferred, in order to ensure that the appropriate signals are sent over control buses 332 and 334.

A typical read cycle occurs as follows. Microcontroller 102 produces a high signal on read/write bus 304 to signify a read cycle. In response, controller 318 sends an enable signal to buffer 316 to allow it to produce an output on bus 300, and controller 318 sends a signal to latch 324, via bus 336, to cause it to latch the data appearing on bus 310 so that it appears at the input of multiplexer 326.

When microcontroller 102 is ready to read the first byte of data, it signals low over chip select bus 302. In response, controller 318 signals multiplexer 326 over bus 330 so that multiplexer 326 sends the first byte of data appearing at its input. Accordingly, the first byte of data appears on bus 300, via buffer 316. When microcontroller is ready to read the second byte of data, it signals low over chip select bus 302, and, in response, controller 318 signals multiplexer 326 to send the second byte of data. The process continues in a similar fashion until all four bytes of data from data out bus 310 have been transferred to bus 300.

As shown in FIGS. 2 and 4, signaling can also occur between correlator 150 and microcontroller 102 directly, without going through interface 170. For example, correlator 150 would typically send IRQ signal 180 to microcontroller 102 directly. Reset signal 182 would also typically go directly from microcontroller 102 to correlator 150.

It should be understood that the embodiments shown and described herein are exemplary only. Various modifications, substitutions, rearrangements, and combinations of these embodiments can be made by those skilled in the art without departing from the spirit and scope of this invention. Accordingly, the true sprit and scope of the invention is defined by the appended claims, to be interpreted in light of the foregoing specification.

What is claimed is:

1. A receiver for a product, said product being controlled by a microcontroller, said receiver comprising:
    a radio frequency (RF) downconverter for downconverting a radio frequency (RF) signal in a first band of frequencies to an intermediate frequency (IF) signal in a second band of frequencies, said RF signal including at least one target signal; and
    a digital signal processor coupled to said RF downconverter and to said microcontroller, said digital signal processor including a correlator for acquiring and tracking said at least one target signal in response to signals from said microcontroller, said digital signal processor including an asynchronous interface for interfacing said correlator with said microcontroller and wherein said asynchronous interface includes at least one last latch for latching digital signals from said microcontroller.

2. A receiver for a product, said product being controlled by a microcontroller, said receiver comprising:
    a radio frequency (RF) downconverter for downconverting a radio frequency (RF) signal in a first band of frequencies to an intermediate frequency (IF) signal in a second band of frequencies, said RF signal including at least one target signal; and
    a digital signal processor coupled to said RF downconverter and to said microcontroller, said digital signal processor including a correlator for acquiring and tracking said at least one target signal in response to signals from said microcontroller, said digital signal processor including an asynchronous interface for interfacing said correlator with said microcontroller and wherein said asynchronous interface includes at least one last latch for latching digital signals from said correlator.

3. A receiver for a product, said product being controlled by a microcontroller, said receiver comprising:
    a radio frequency (RF) downconverter for downconverting a radio frequency (RF) signal in a first band of frequencies to an intermediate frequency (IF) signal in a second band of frequencies, said RF signal including at least one target signal; and
    a digital signal processor coupled to said RF downconverter and to said microcontroller, said digital signal processor including a correlator for acquiring and tracking said at least one target signal in response to signals from said microcontroller, said digital signal processor including an asynchronous interface for interfacing said correlator with said microcontroller and wherein at least a portion of said RF downconverter and at least a portion of said digital signal processor are disposed in a substantially monolithic integrated circuit.

4. A receiver for a product, said product being controlled by a microcontroller, said receiver comprising:
    a radio frequency (RF) downconverter for downconverting a radio frequency (RF) signal in a first band of frequencies to an intermediate frequency (IF) signal in a second band of frequencies, said RF signal including at least one target signal, wherein said RF downconverter includes at least one amplifer, at least one mixer, at least one bandpass filter, and at least one local oscillator coupled to said at least one mixer, and wherein said at least one local oscillator includes a frequency synthesizer coupled to a reference oscillator;
    a product oscillator, wherein said frequency synthesizer uses said product oscillator as said reference oscillator, and wherein said product oscillator provides a clock signal for said microcontroller; and
    a digital signal processor coupled to said RF downconverter and to said microcontroller, said digital signal processor including a correlator for acquiring and tracking said at least one target signal in response to signals from said microcontroller, said digital signal processor including an asynchronous interface for interfacing said correlator with said microcontroller.

5. A receiver for a product, said product being controlled by a microcontroller, said receiver comprising:

a radio frequency (RF) downconverter for downconverting a radio frequency (RF) signal in a first band of frequencies to an intermediate frequency (IF) signal in a second band of frequencies, said RF signal including at least one target signal, wherein said RF downconverter includes at least one amplifer, at least one mixer, at least one bandpass filter, and at least one local oscillator coupled to said at least one mixer, and wherein said at least one local oscillator includes a frequency synthesizer coupled to a reference oscillator, wherein said at least one amplifier, said at least one mixer, said frequency synthesizer, and said correlator are disposed in a substantially monolithic integrated circuit; and a digital signal processor coupled to said RF downconverter and to said microcontroller, said digital signal processor including a correlator for acquiring and tracking said at least one target signal in response to signals from said microcontroller, said digital signal processor including an asynchronous interface for interfacing said correlator with said microcontroller, and wherein said asynchronous interface is disposed in said substantially monolithic integrated circuit.

6. A receiver for a product, said product being controlled by a microcontroller, said receiver comprising:

a radio frequency (RF) downconverter for downconverting a radio frequency (RF) signal in a first band of frequencies to an intermediate frequency (IF) signal in a second band of frequencies, said RF signal including at least one target signal;

a digital signal processor coupled to said RF downconverter and to said microcontroller, said digital signal processor including a correlator for acquiring and tracking said at least one target signal in response to signals from said microcontroller, said digital signal processor including an asynchronous interface for interfacing said correlator with said microcontroller, and wherein said correlator includes:

(a) a signal input block for producing an in-phase signal and a quadrature signal from said IF signal;

(b) a pseudo-random noise (PN) generator for producing at least one PN signal;

(c) a signal processor, coupled to said signal input block and to said PN generator, for producing at least a prompt in-phase (PI) signal, from said at least one PN signal and said in-phase signal, and for producing a prompt quadrature (PQ) signal, from said at least one PN signal and said quadrature signal;

(d) an integrator, coupled to said signal processor, for integrating said PI signal and said PQ signal to provide an integrator output, said integrator output including an integrated PI signal and an integrated PQ signal; and (e) an interrupt generator, said interrupt generator producing an interrupt signal at predetermined time intervals for signaling said microcontroller to read said integrator output.

7. The receiver of claim 6, wherein said signal input block of said correlator includes an analog to digital (A/D) converter and a demodulator.

8. A substantially monolithic integrated circuit for a receiver, said substantially monolithic integrated circuit comprising:

radio frequency (RF) downconverter circuitry for downconverting a radio frequency (RF) signal in a first band of frequencies to an intermediate frequency (IF) signal in a second band of frequencies, said RF signal including at least one target signal; and a digital signal processor coupled to said RF downconverter circuitry, said digital signal processor including a correlator for acquiring and tracking said at least one target signal.

9. The receiver of claim 8, wherein said a least one target signal includes at least one global positioning system (GPS) signal.

10. The receiver of claim 9, wherein said at least one GPS signal is transmitted from at least one satellite.

11. The substantially monolithic integrated circuit of claim 8, wherein said RF downconverter circuitry includes:

at least one amplifier for producing an amplified signal;

at least one frequency synthesizer for producing a local oscillator signal; and at least one mixer for mixing said amplified signal with said local oscillator signal.

12. The substantially monolithic integrated circuit of claim 11, wherein said frequency synthesizer is disposed to use an external reference oscillator.

13. The substantially monolithic integrated circuit of claim 11, wherein said frequency synthesizer is disposed to use at least one external frequency selective component.

14. The substantially monolithic integrated circuit of claim 11, further comprising a frequency divider for producing a clock signal for said digital signal processor from said local oscillator signal.

15. The substantially monolithic integrated circuit of claim 11, wherein said digital signal processor includes an interface for interfacing said correlator and said frequency synthesizer with an external microcontroller.

16. The substantially monolithic integrated circuit of claim 11, wherein said digital signal processor includes:

a random access memory; and an interface for interfacing said correlator, said frequency synthesizer, and said random access memory with an external microcontroller.

17. The substantially monolithic integrated circuit of claim 8, wherein said digital signal processor includes an interface for interfacing said correlator with an external microcontroller.

18. The substantially monolithic integrated circuit of claim 17, wherein said interface is an asynchronous interface.

19. The substantially monolithic integrated circuit of claim 16, wherein said correlator includes:

(a) a signal input block for producing an in-phase signal and a quadrature signal from said IF signal;

(b) a pseudo-random noise (PN) generator for producing at least one PN signal;

(c) a signal processor, coupled to said signal input block and to said PN generator, for producing at least a prompt in-phase (PI) signal, from said at least one PN signal and said in-phase signal, and for producing a prompt quadrature (PQ) signal, from said at least one PN signal and said quadrature signal;

(d) an integrator, coupled to said signal processor, for integrating said PI signal and said PQ signal to provide an integrator output, said integrator output including an integrated PI signal and an integrated PQ signal; and (e) an interrupt generator, said interrupt generator producing an interrupt signal at predetermined time intervals for signaling an microcontroller to read said integrator output.

20. The substantially monolithic integrated circuit of claim 19, wherein said signal input block of said correlator includes an analog to digital (A/D) converter and a demodulator.

21. A method of using a microcontroller to obtain data from a signal, said method comprising the steps of:

receiving a radio frequency (RF) signal in a first band of frequencies;

downconverting said RF signal to an intermediate frequency (IF) signal in a second band of frequencies;

digitizing said IF signal to provide a digital signal;

correlating said digital signal with a replica signal to provide output data;

generating an interrupt signal at predetermined time intervals; and in response to said interrupt signal, said microcontroller reading said output data through an asynchronous interface, wherein said microcontroller generating a read signal, and wherein in response to said read signal, said asynchronous interface latching said output data to provide latched output data.

22. The method of claim 21, wherein said step of said microcontroller reading said output data further includes the steps of:

said microcontroller generating a select signal; and in response to said select signal, said asynchronous interface transmitting at least a portion of said latched output data to said microcontroller.

23. A method of using a microcontroller to obtain data from a signal, said method comprising the steps of:

receiving a radio frequency (RF) signal in a first band of frequencies;

downconverting said RF signal to an intermediate frequency (IF) signal in a second band of frequencies;

digitizing said IF signal to provide a digital signal;

correlating said digital signal with a replica signal to provide output data;

generating an interrupt signal at predetermined time intervals; and in response to said interrupt signal, said microcontroller reading said output data through an asynchronous interface;

said microcontroller writing input data to a signal generator, wherein transferring said input data from said microcontroller to said signal generator through said asynchronous interface; and said signal generator generating said replica signal in response to said input data.

24. The method of claim 23, wherein said step of transferring said input data from said microcontroller to said signal generator includes the step of:

said microcontroller generating a select signal; and in response to said select signal, said asynchronous interface latching said input data to said signal generator.

* * * * *